3,629,331
STABILIZATION OF UREA PEROXIDE
Bernard L. Kabacoff, Norwalk, and Charles M. Fairchild, Old Greenwich, Conn., assignors to Revlon, Inc.
No Drawing. Filed Sept. 9, 1969, Ser. No. 856,460
Int. Cl. C07c *127/00*
U.S. Cl. 260—555 R      3 Claims

ABSTRACT OF THE DISCLOSURE

Urea peroxide is stabilized against decomposition by incorporating therewith from about at least 0.02% each by weight of urea peroxide ethylenediaminetetraacetic acid and sodium dihydrogen pyrophosphate.

---

This invention relates to a process for stabilizing urea peroxide. It particularly relates to a process for maintaining urea peroxide in a substantially stable, free-flowing condition while stored in containers.

Urea peroxide is a valuble source of oxygen and a very useful oxidizing agent, being widely used in the cosmetic, pharmaceutical, chemical and photographic fields. However, on storage the compound slowly decomposes losing its oxygen thereby becoming less potent as an oxidizing agent. Furthermore, water, which is a product of the decomposition, apparently catalyzes further decomposition and causes clumping of the product. The decomposition occurs at room temperature and increases rapidly as the temperature rises, so that at about 50° C. the urea peroxide will lose substantially all of its activity in about 30 days. Since the temperature of the surroundings in which urea peroxide is either stored or transported will frequently reach temperatures of about 50° C. there is need for maintaining the stability of the urea peroxide over long periods of time.

It is, accordingly, an object of this invention to provide a process for maintaining urea peroxide during storage in a substantially stable, free-flowing condition.

It is a further object of this invention to provide a stabilized composition of urea peroxide, which composition may be used in a hair dyeing composition and is suitable for use with the reductants used therein.

It is a still further object of this invention to provide a substantially anhydrous, stable, free-flowing urea peroxide composition.

In accordance with this invention we have found that the admixture of urea peroxide with both a chelating agent such as ethylenediaminetetraacetic acid, and a phosphate, such as sodium dihydrogen pyrophosphate ($Na_2H_2P_2O_7$), will result in a composition containing urea peroxide which remains stable even when stored at 50° C. for as long as one (1) month.

While ethylenediaminetetraacetic acid (EDTA) is the chelating agent of choice, other chelating agents, such as ethylenediaminetriacetic acid, 8-hydroxyquinoline, gluconic acid, the alkali metal and alkaline earth metal salts of EDTA, and the like may also be used. The alkali and alkaline earth metal salts of phosphoric acid and metaphosphoric acid, as well as the other alkali and alkaline earth metal salts of pyrophosphoric acid, may be used in place of $Na_2H_2P_2O_7$.

We have found that as little as 0.02% by weight each of EDTA and $Na_2H_2P_2O_7$, based on the weight of urea peroxide when intimately mixed with the urea peroxide, will inhibit its decomposition. While we have found no upper limit as to the amounts of EDTA and $Na_2H_2P_2O_7$ which may be admixed with urea peroxide before any incompatibility with other components of hair dye mixtures is noted, as a practical matter, we do not add the EDTA and $Na_2H_2P_2O_7$ each in amounts exceeding 20% by weight of the urea peroxide. Preferably, we add the EDTA and $Na_2H_2P_2O_7$ in amounts from about 0.1% to about 10% by weight of the urea peroxide, with a preferred amount of about 1%. Although we use substantially the same weight percentage of urea peroxide for both the EDTA and $Na_2H_2P_2O_7$, this is not necessary, and we can use different percentages of each inrgedient, such as, for example, 1.0% EDTA and 0.5% $Na_2H_2P_2O_7$, 0.5% EDTA and 1.0% $Na_2H_2P_2O_7$, 0.2% EDTA and 1.0% $Na_2H_2P_2O_7$, and the like.

In practicing our invention we intimately mix the selected amounts of urea peroxide, EDTA and $$Na_2H_2P_2O_7$$

The intimate mixing may be readily achieved by ball milling until tests show that the admixture is substantially uniform. The ingredients are used in free-flowing form and preferably in a substantially anhydrous condition.

If it is desired to maintain the anhydrous condition of the mixture, and thereby prevent or substantially reduce and tendency of the mixture to form clumps, absorbing agents such as mannitol, infusorial earth or silica may be added. Preferably, an anhydrous silica such as colloidal silica having at least about 90% by weight of silicon dioxide or a moisture content of less than 5% by weight, may be admixed with the urea peroxide, EDTA and $Na_2H_2P_2O_7$ in an amount of about 3% to 9% the weight of urea peroxide.

In accordance with the above procedure, the following stabilized urea peroxide compositions were prepared:

| Preparation number | Urea peroxide | EDTA | $Na_2H_2P_2O_7$ | Silica |
|---|---|---|---|---|
| 1 | 100 | 1 | 1 | 0 |
| 2 | 100 | 1 | 0.5 | 0 |
| 3 | 50 | 0.25 | 0.5 | 0 |
| 4 | 100 | 0.2 | 0.2 | 0 |
| 5 | 100 | 0.5 | 0.5 | 0 |
| 6 | 1 | 0.01 | 0.01 | 0.03 |
| 7 | 1 | 0.01 | 0.01 | 0.06 |
| 8 | 1 | 0.01 | 0.01 | 0.09 |
| 9 | 1 | 0.005 | 0.01 | 0.03 |
| 10 | 10 | 0.1 | 0.05 | 0.03 |
| 11 | 10 | 0.01 | 0.01 | 0 |
| 12 | 10 | 0.02 | 0.02 | 0 |

The numerical values represent kilograms.

These preparations showed practically no loss in the oxidizing potency of the peroxide after being stored at 50° C. for one month.

The above compositions were suitable for use with dyeing compositions and gave the same dyeing results as obtained with urea peroxide alone.

We claim:

1. A stabilized urea peroxide composition consisting essentially, in parts by weight, of

| | |
|---|---|
| Urea peroxide | 100 |
| Ethylenediaminetetraacetic acid | 0.02–20 |
| Sodium dihydrogen pyrophosphate | 0.02–20 |

2. A composition according to claim 1 having 1 part ethylenediaminetetraacetic acid and 1 part sodium dihydrogen pyrophosphate.

3. A composition according to claim 2 having from about 3 to 9 parts anhydrous silica.

References Cited

FOREIGN PATENTS

| | | |
|---|---|---|
| 26,960 | 4/1912 | Great Britain _____ 260—555 R |
| 1,056,121 | 1/1967 | Great Britain. |
| 1,056,122 | 1/1967 | Great Britain. |
| 1,056,123 | 1/1967 | Great Britain. |

LEON ZITVER, Primary Examiner

M. W. GLYNN, Assistant Examiner

U.S. Cl. X.R.

8—10.2